Oct. 25, 1966   S. B. COHN   3,281,720
WAVEGUIDE HYBRID JUNCTION
Filed Feb. 21, 1964   2 Sheets-Sheet 1
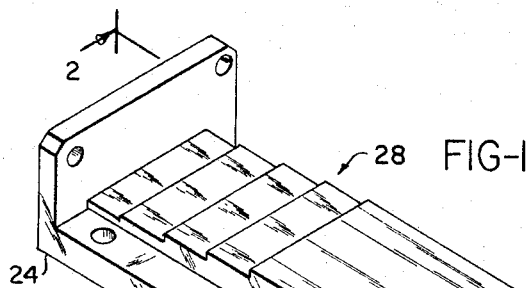
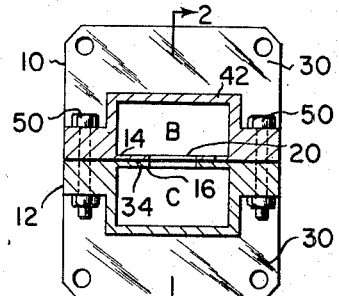
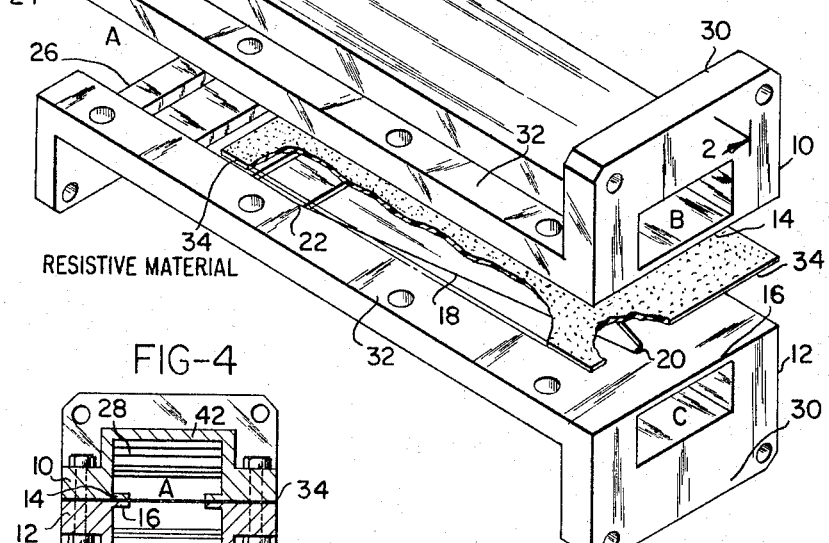
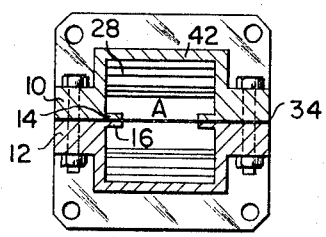
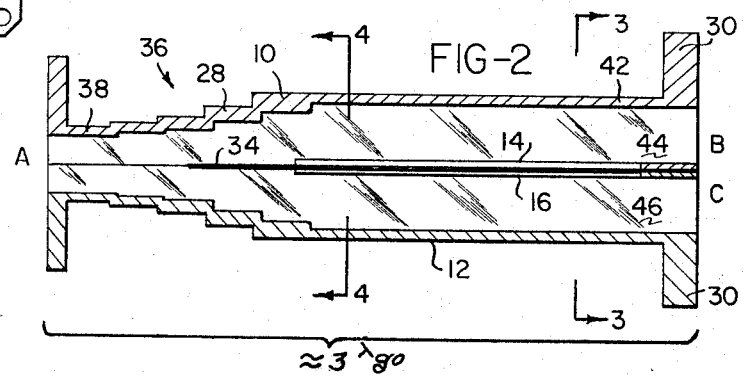
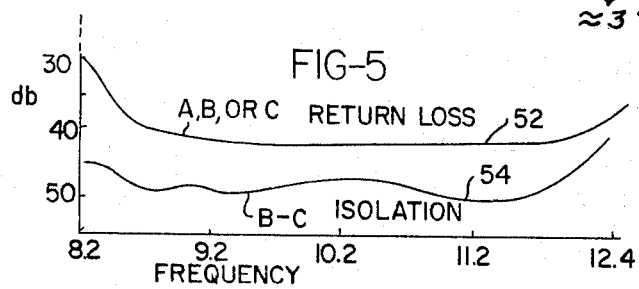
INVENTOR.
SEYMOUR B. COHN
BY
Nilsson, Robbins & Anderson
ATTORNEYS

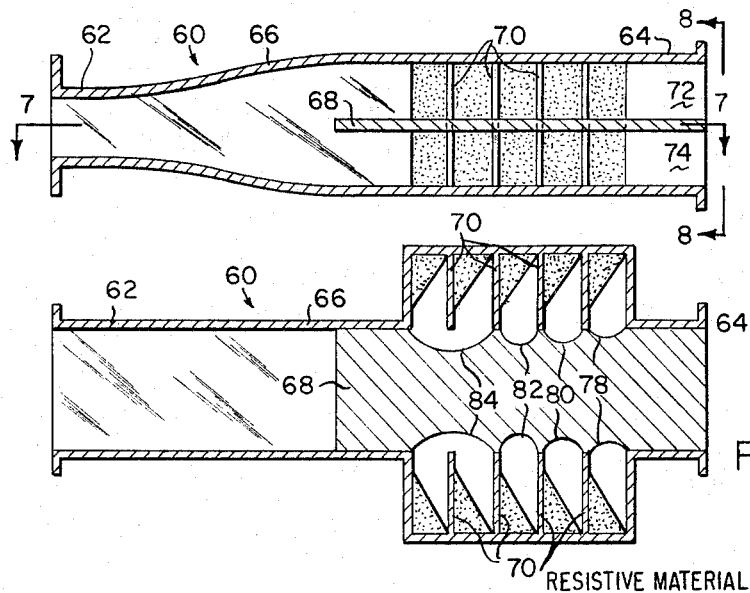
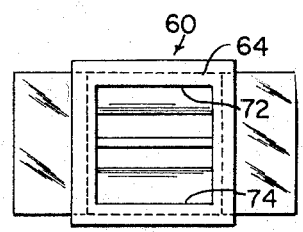
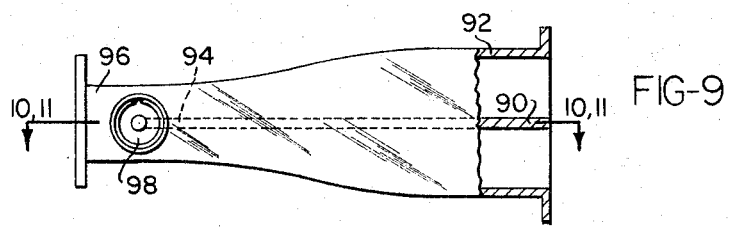
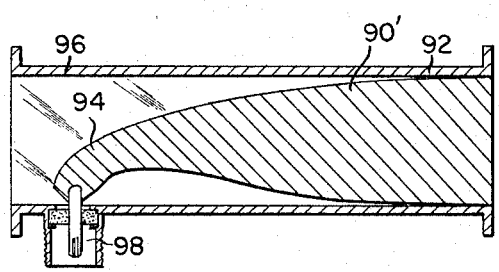
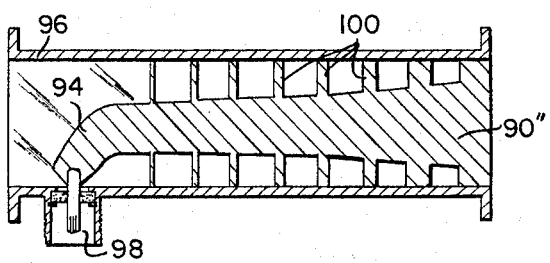

United States Patent Office 3,281,720
Patented Oct. 25, 1966

3,281,720
WAVEGUIDE HYBRID JUNCTION
Seymour B. Cohn, Hidden Hills, Calif., assignor, by mesne assignments, to Emerson Electric Company, St. Louis, Mo.
Filed Feb. 21, 1964, Ser. No. 346,462
11 Claims. (Cl. 333—11)

This invention relates generally to waveguide network junctions and more particularly to such junctions normally designated as magic tee hybrids.

Magic tee hybrids have been known and extensively utilized in the microwave art for many years. They typically comprise a short length of rectangular waveguide having shunt and series ("H" and "E") arms extending laterally therefrom at a common point along its length, with the ends of the original waveguide constituting "side ports." Such devices have unique and highly useful characteristics such as for signal dividing or combining, directional coupling, and many other such uses in modern microwave systems.

In various utilizations it is important that the isolation between the side arms be as high as possible and that the VSWR (voltage standing wave ratio), or "return loss," at each port be as low as possible.

It is also important that the component be as small and as light in weight as possible especially when the use is to be in airborne or compact test equipment applications. The minimization of the geometric dimensons has previously, in some types of hybrids, been severely limited by the fact that the four ports all extend from the center of the T outwardly in three orthogonal directions with the side arms extending in opposite directions. Furthermore even when one of the ports is not extensively utilized and is therefore terminated as by a resistive load, the load must be externally coupled to the unused port thereby adding additional waveguide plumbing with its incumbent weight and space requirements and expense.

Electrically the best prior art narrow band (10 to 20%) hybrid T's heretofore known exhibit VSWR's of at least 1.1 and isolation between the side ports of approximately 25 db. For full waveguide bandwidths (approximately 40%), the best prior art performance is a VSWR of 1.4 at full four ports, and side port isolation of approximately 15 db.

It is accordingly an object of the present invention to provide a waveguide hybrid T junction component which is not subject to these and other disadvantages of the prior art.

It is another object to provide such a component which exhibits a maximum of 1.1 VSWR or less over a greater than 40% bandwidth.

It is another object to provide such a hybrid junction which is capable of handling microwave power at the rate of more than 100 watts C.W.

It is another object to provide a waveguide junction in which the shunt, or H, port may be intrinsically, non-reflectively terminated as by distributed absorption of the energy which would otherwise flow through that port.

It is another object to provide a component which is exceedingly compact and does not require coupling arms which extend orthogonally from the body of the junction.

It is another object to provide such a device in which the side ports and the E port extend along the same direction, albeit in different senses thereof, and in which the total lateral dimensions are not more than the width of the system waveguide, and the length of which is less than approximately two wavelengths of the operating microwave energy in the device.

It is another object of the present invention to provide such a device which has substantially perfect mechanical and electrical symmetry.

It is another object to provide such a component which is mechanically rugged and relatively readily mass produced with excellent repeatability.

It is another object to provide such a hybrid in which the shunt or H-arm energy is non-reflectingly removed from the intrinsic hybrid structure.

Briefly these and other objects and advantages are achieved in an example of the invention which includes a length of rectangular standard height, at one end, waveguide which is transformed into approximately double height waveguide at the other end. The transition may be achieved by symmetrically tapering or stepping the waveguide walls. Thus the waveguide is standard rectangular waveguide at one end and approximately double height or square at the other end.

A conductive septum disposed along a plane of symmetry parallel to the broad wall of the standard height end is disposed across the waveguide in a manner to divide the double height end into a pair of juxtaposed, substantially standard height waveguide segments which are each coupled in line through the transition section to the standard height end. The isolating septum extends toward or partially into the transition section and includes a lossy vane of, for example, 200 ohms per square metalized Mylar film extending coplanarly with the conductive portion of the septum.

The isolated ports thusly constitute the side ports and the standard height end is the E or series port. The energy which would otherwise be coupled to a shunt or H port is absorbed in the distributed resistive loading of the Mylar film. By this means the side ports are excellently mutually isolated and, because of the substantially perfect geometrical symmetry, the power division of energy from the E port into the two side ports is substantially perfect; that is without loss or reflections. Similarly the power combining of equal in-phase components from the side ports into the E port is substantially perfect.

The details of these and other novel features and the principles of operation as well as additional objects and advantages of the invention will become apparent and be best understood from a consideration of the following description taken in connection with the accompanying drawings which are all presented by way of illustrative example only and in which:

FIG. 1 is a perspective, exploded view of a microwave hybrid T junction constructed in accordance with the principles of the invention;

FIG. 2 is a central longitudinal sectional view of the structure of FIG. 1 taken along the lines 2—2 thereof;

FIG. 3 and FIG. 4 are cross sectional view of the structure of FIG. 1 taken along the lines 3—3 and 4—4, respectively of FIG. 2;

FIG. 5 is a graph plotting, in decibels, the return losses of the various ports and the inter-port isolation, on the ordinate, as a function of microwave frequency, on the abscissa, for use in describing the operation of the invention;

FIG. 6 is a longitudinal sectional view of an alternative example of the invention;

FIG. 7 is a longitudinal sectional view of the structure shown in FIG. 6 taken along the lines 7—7 thereof;

FIG. 8 is an end elevational view of the structure of FIG. 6 taken in the direction of the arrows 8—8 thereof;

FIG. 9 is a partially elevational, partially broken away sectional view of another example of the hybrid T junction of the present invention; and FIG. 10 and FIG. 11 are longitudinal sectional view of alternative examples of the embodiment of FIG. 9 taken along the lines 10—10 and 11—11, respectively, thereof.

Referring to the figures in more detail it is stressed that the particulars shown are by way of example, and for purposes of illustrative discussion only and are presented in the cause of providing what is believed to be the most useful and readily understood description of the principles and structural concepts of the invention. In this regard, no attempt is made herein to show structural details of the apparatus in more detail than is necessary for a fundamental understanding of the invention, the description taken with the drawings making apparent to those skilled in the art how the several forms of the invention may be embodied in practice. Specifically the detailed showing is not to be taken as a limitation of the scope of the invention which is defined by the appended claims forming, along with the drawings, a part of this specification.

Referring to FIG. 1 the pictured example of the invention comprises a pair of substantially identical junction halves 10, 12. When assembled, the junction halves 10, 12 are, as indicated by the exploded view, juxtaposed as mirror images about a plane of symmetry disposed therebetween and defined by the planar boundary between the two halves. Each of the junction halves 10, 12 includes at its right hand end, as viewed in the drawing, a conductive septum member 14, 16 respectively. In this manner the right hand end of the junction halves is, in each case, a segment of waveguide having substantially standard height and width dimensions and one broad wall of which is defined by the respective conductive septum member.

The septum member in each case extends axially toward the opposite end of the assembly for a distance of approximately one waveguide wavelength at the low-frequency end of the operating bandwidth. The septum members are each tapered along their longitudinal length by an elongated V cut 18 the apex 20 of which is disposed along the center line of the assembly contiguously to the right hand end thereof, while the open or base 22 of the V cut is disposed toward the opposite end and terminates in the narrow waveguide walls approximately half way between the ends of the junction halves.

The left hand ends 24, 26 of the junction halves 10, 12 form, when assembled, a substantially standard height waveguide segment, whose axial length may be quite short, interposed between the standard height left hand end of the assembly and the substantially double height right hand end of the assembly, the latter being formed by the septum members 14, 16.

There is formed in this example a height transition section 28 which includes a four step impedance transformer as shown. Each of the ends of the waveguide junction halves may be formed with a customary connecting flange 30 for coupling the junction to external circuitry, not shown. Similarly the narrow waveguide wall of each of the junction halves of the assembly may be formed to include a longitudinally extending assembly flange 32 by which means the two junction halves may be securely bolted together, as shown in the subsequent figures.

Prior to the bolt together assembly of this example of the invention, a thin resistive film segment 34 is disposed between the two halves, sandwiched between the septum members 14, 16, and extending therebeyond toward the opposite, left hand ends 24 and 26 to an extent, in this example, well within the transition section 28. The film may be any dielectric material, such as Mylar or mica having a resistive coating formed from a suspension of minute graphite particles. Alternatively, a very thin layer of metal such as chromium may be deposited on the dielectric as by vaporization techniques. The metal being in the form of a very thin film exhibits a very high resistance and may be applied to provide a desired microwave energy absorption characteristic as discussed in more detailed below. Thickness of the dielectric sheet is not critical, and is typically about 0.001 inch.

A convenient method of assembling, particularly when the thin flexible Mylar film is to be used, is to place a larger than necessary sheet of the Mylar between the junction halves, bolt them together, and then trim off the excess film extending beyond the edges of the assembly flanges 32. Because the film is extremely thin, the finite gap which it creates between the assembly flanges and the junction halves has no appreciable electrical effect because of the high capacitance across the gap as seen by the operating microwave frequency energy.

Referring to FIG. 2 the junction halves 10, 12 are shown assembled as a complete hybrid T junction 36 having a standard height waveguide end portion 38, a substantially double height waveguide end portion 42, and a height transition section 28 connected therebetween. The combined septum members 14, 16 divide the end portion 42 into a pair of substantially standard height waveguide segments 44, 46.

The resistive film 34 is shown in place as extending from the right hand end of the T junction 36 along the entire length of the combined septum portions 14, 16 and extending well into the height transition section 28. It may be noted in this example that at their right hand ends, as seen in the figure, the septum members, the resistive film, the waveguide segments 44, 46, the waveguide end portion 42, and the connecting flanges 30 may be all coextensive.

For convenience, the three ports of the assembled junction halves 10, 12 are labeled, throughout the figures referring to this example, of the invention as follows: the port associated with the standard height waveguide end portion 38 is denoted port A; and the ports associated with the waveguide segments 44, 46 are denoted port B and port C respectively.

In the sectional view of FIG. 3, which is taken looking toward the ports B and C from the double height waveguide end portion 42, the sandwiched relationship of the resistive film 34 between the septum members 14, 16 is illustrated. Also shown in this figure are the assembly screws 50 which compress the resistive film 34 between the two junction halves 10, 12 when assembled. The apex 20 of the tapered V cut 18 is also shown in FIG. 3.

In FIG. 4 a cross sectional view similar to that of FIG. 3 is presented which is however, taken in the opposite direction toward port A as indicated. The walls of the waveguide portion 42 are shown in joining hose of the height transition section 28. Again the resistive film 34 is shown compressed between the junction halves 10, 12 and, in particular, between the juxtaposed portions of the septum members 14, 16, which due to the taper illustrated above, are laterally less extensive than as shown in FIG. 3.

In constructed embodiments of the form of the invention heretofore described, the total length of the hybrid T junction is approximately three waveguide wavelengths at center frequency, distributed longitudinally approximately in the scale indicated in FIG. 2. In a particular example constructed for utilization in the band of 8.2 to 12.4 gc. the impedance transition section was a 4 section stepped transformer about 1.5 inches long. The septum taper was approximately 2.5 inches in length. The total combined thickness of the sandwiched septum members 14, 16 was approximately 0.1 inch. The height and width of each of the ports A, B and C was .400 x .900 inch respectively. The total height of the impedance transformation steps were, in left to right order, .430 inch, .524 inch, .684 inch and .835 inch, while the total internal height of the double height waveguide end portion 42 was 0.900 inch including the thickness of the septum sandwich.

When the resistive film between the metallic septum members 14, 16 is 200 ohms per square Mylar having a thickness of 0.001 inch the electrical performance of the waveguide hybrid junction is indicated by the curves of FIG. 5. With the other ports connected to well matched loads, the return loss from any of the ports A, B or C, is at least 30 db across the 8.2–12.4 gc. frequency band as indicated by the return loss curve 52. The curve 54 shows the minimum isolation between the symmetrical or side arms of the T (port B and port C) to about 40 db across the band. These results may be compared with approximately 15 db of return loss and side port isolation in the best prior art broad band waveguide T hybrids. It may be noted that such results are even significantly better than the return losses and side port isolations of the best prior art narrow band waveguide T hybrids.

In this particular form of the invention, the shunt or H port is terminated internally by the dissipating character of the resistive film 34. Thus only the series or E port and the two side ports are available for external connection. Such structures are particularly useful as power dividers or power combiners. Functioning as the former, precisely equal division of the power incident at port A is achieved as a result of the physical symmetry, so that equal magnitudes of in-phase power is emergent at ports B and C. Any microwave energy traversing the T in this direction is unaffected by the resistive film.

Similarly microwave energy entering port B and port C in the same phase and amplitude also will be substantially totally unaffected by the resistive film 34 and will emerge as one combined wave at port A. If the microwave signals entering ports B and C are 180 degrees out of phase, they cannot emerge from port A and will be absorbed by the intrinsically terminated H port, namely the resistive film 34.

The reflection performance for in-phase operation of the hybrid T in either direction is particularly effective because of the proper tapering or impedance stepping of the height transition section 28. Similarly the reflection performance for out-of-phase operation of the hybrid is excellent because the absorbing film and the metallic septum are designed as described above to absorb the H-plane energy in a gradual or distributed manner. Thusly, when functioning as a hybrid junction, a wave entering port B will be isolated from port C while half this energy will emerge from port A and half will be absorbed by the resistive film 34.

Constructed examples of the above-described form of the invention have been utilized typically to handle approximately 20 watts of average, microwave power in a hybrid mode of operation with the Mylar film absorbing approximately 2 watts. When metallized mica is used as the resistive film 34, it can readily dissipate 10 watts of average power with the device handling 100 watts. As indicated, these are average powers; the resistive film in either type of case appears able to handle peak powers limited only by the overall geometry.

In FIG. 6, FIG. 7 and FIG. 8, an example of the invention is illustrated which is particularly useful when it is desired to dissipate even higher amounts of microwave energy in the H-plane. In this example, as above, the T junction 60 comprises a standard height waveguide end 62 and a double height waveguide end 64 which are interconnected by a height transition section 66 shown in this example as a continuously tapered section. Coextensive with the double height waveguide portion 64 and a portion of the transition section 66 is a conductive septum 68 disposed along the plane of symmetry between the opposite broad walls of the junction in a manner to divide the double height section into a pair of juxtaposed standard height waveguide sections 72, 74. The metallic septum extends from the double height end of the junction toward or into the height transition section 66 as illustrated.

Microwave energy which would otherwise be coupled out of the H-port of the magic T waveguide junction or, in the previous embodiment, be absorbed in the resistive vane, is coupled from the metallic septum 68 to a plurality of absorbing chambers 70 which are disposed in the walls of the double height waveguide section perpendicularly to the conductive septum 68. The height of the chambers 70 in this example is approximately equal to that of the double height waveguide section 64, and their width in the direction of the length of the junction 60 is considerably less. Each of the absorbing chambers 70 has disposed therein a block of resistive material in the form of a tapered wedge as shown. By this means energy coupled into the cavities is absorbed and dissipated through the metallic walls of the chambers and waveguide which may be externally force cooled when desired for purposes of maximizing the junction power handling capability.

Coupling into the absorbing chambers is achieved by a series of coupling apertures 78, 80, 82, 84 formed along the edge of the septum 68 oppositely from the port or open end of respective ones or pairs of absorbing chambers 70 and which are progressively larger for purposes of tapering the percentage of coupling of the H-plane energy into their respective absorbing chambers.

Referring to FIG. 9 an example of the invention is illustrated which is similar structurally, in many respects, to that illustrated in the preceding figures. However, in this example of the invention a metallic septum 90 utilized in the double height waveguide portion 92 is coupled to a stripline conductor 94 in the single height waveguide section 96 from whence it may be coupled symmetrically out of the waveguide junction onto a coaxial conductor pair 98. In this form of the invention, therefore, the shunt port of the waveguide junction is available for external connection either for dissipation of unwanted power or for conventional hybrid purposes. It may be noted in this case that the isolation between the shunt and series ports depends only on the physical symmetry of the junction with respect to the plane of symmetry defined by the metallic septum. When the symmetry is perfect the isolation also is perfect.

In FIG. 10 one embodiment of the form of the invention illustrated in FIG. 9 is shown in a plan type of longitudinal sectional view. In this example the metallic septum 90' is very gradually tapered away from the sidewalls of the double height waveguide section 92 and becomes progressively narrower in the height transition section toward the single height waveguide portion 96 where ultimately the septum becomes an approximately 50 ohm section of stripline 94. The stripline is shown in these examples to be coupled in a conventional manner to a coaxial conductor pair 98. However, it should be understood that of course the coupling may be a waveguide port by means of a coaxial to waveguide junction in a conventional manner.

In operation, the tapered metallic septum becomes a TEM mode stripline conductor and the $TE_{11}$ mode cannot propagate in this region of the junction. It may be noted that in the increased height region 92, both the TEM and the $TE_{11}$ mode can propagate.

In the embodiment of FIG. 11 an alternative transition means between the metallic septum 90″ and the stripline segment 94 is illustrated which is particularly advantageous in applications where the smoothest possible transition is desired for broadband operation. In this embodiment the septum width as viewed in the figure is narrower throughout most of its length than in the case illustrated in FIG. 10. However, the metallic septum is connected to the sidewalls of the waveguide junction by means of a series of stub conductors 100. The stub conductors are approximately one-quarter wavelength in space long and are spaced from each other by approximately the same distance as their length. It has been found to be preferable to taper the thickness of the stub conductors in the manner shown so that they become narrower, progressively, toward the stripline segment 94. Similarly the transition is assisted by making the stub conductors 100 progressively longer in the same direction of transition.

There has thus been disclosed a number of examples of a microwave hybrid T junction which exhibits the advantages and achieves the objects set forth hereinabove.

What is claimed is:

1. A microwave hybrid T junction comprising a length of rectangular type waveguide having first and second end portions and means for substantially non-reflectingly effectively removing H arm energy from said length of waveguide including a planar isolating septum disposed longitudinally and laterally across a pair of opposite walls of said second end portion to form a pair of parallel, coextensive waveguide segments, said isolating septum having first and second ends with said second end being disposed coextensively with said second end portion of said waveguide, and said first end of said septum extending toward said first end portion of said waveguide, said second end of said septum being substantially entirely conductive, said waveguide second end portion having approximately twice the internal waveguide height of said first end portion and further including waveguide height transition means coupled between said first and second end portions, said isolating septum further comprising a conductive vane portion closed at its said second end and a resistive film disposed at its said first end, and septum transition means disposed intermediate said ends, said septum transition means including a laterally tapered vane portion having one end composed predominantly of resistive film affixed to said first end, a second end composed predominantly of a conductive sheet affixed to said second end, and a mid section tapered laterally symmetrically with respect to its conductive sheet-resistive film composition.

2. The invention according to claim 1 in which said pair of parallel coextensive waveguide segments and said transition means are internally substantially symmetrical about said isolating septum.

3. The invention according to claim 1 in which said waveguide first end portion is substantially standard rectangular waveguide having predetermined height and width dimensions and in which said parallel coextensive waveguide segments of said second end portion each have height and width dimensions which are substantially equal to those respectively of said first end portion.

4. The invention according to claim 1 in which said transition means includes a stepped height waveguide section whose opposite broad walls are stepped symmetrically with respect to said isolating septum.

5. The invention according to claim 1 in which said transition means includes a tapered height waveguide section, the lateral spacing of whose opposite broad walls is tapered symmetrically with respect to said isolating septum.

6. A microwave hybrid junction comprising: a length of waveguide having first and second ends and including first and second end portions disposed contiguously respectively to said first and second ends and having a height transition section interposed between said first and second end portions, said first end portion having substantially standard rectangular waveguide internal width and height dimensions forming broad and narrow waveguide walls, respectively, said second end portion having said standard width dimension and having approximately twice the standard height dimension, said height transition section having a height which varies from said substantially standard height at its connection with said first end portion to said approximately twice standard height at its connection with said second end section, said microwave hybrid junction having a longitudinal plane of symmetry disposed parallel to the width dimension of said waveguide portions; an isolating septum disposed along said plane of symmetry longitudinally coextensively with at least said second end portion, said septum extending laterally to the narrow waveguide walls and extending longitudinally to at least a portion of the length of said height transition section, at least a portion of said septum having a conductive vane interconnecting the center lines of opposite ones of said narrow walls, said septum dividing at least the major part of said waveguide second end portion into a pair of coextending waveguide segments having approximately standard height and width dimensions and further including a plurality of rectangular waveguide cavity H-plane energy absorbing chambers and coupling aperture means carried by said narrow walls of said second waveguide end portion for coupling H-plane energy from said system to said absorbing chambers, said waveguide cavity absorbing chambers being formed integrally with said narrow walls, and each said chamber having broad walls disposed in planes perpendicular to said septum and narrow walls in planes parallel therewith.

7. The invention according to claim 6 in which another portion of said isolating septum is resistive film for absorbing H-plane energy.

8. The invention according to claim 6 in which said isolating septum is a conductive vane extending longitudinally through said waveguide second end portion and at least partially into said height transition section, said vane having a first end extending towards said first end of said length of waveguide and a second end extending to said second end of said length of waveguide and which further includes coupling means disposed through one of said narrow walls and connected to said first end of said septum, said septum having full waveguide width near its said second end and having a narrow connective width at its said first end and being spaced from said narrow walls along its length between its full width and narrow connective width portions, and which further includes longitudinally spaced connecting elements extending laterally from said septum to the longitudinal center line of said narrow walls.

9. The invention according to claim 8 in which said septum is tapered substantially continuously from full standard waveguide width at its said second end to a narrow, connector width at its first end for attachment to said coupling means.

10. A microwave hybrid T junction comprising: at least one waveguide body member having first and second end portions and being disposed substantially symmetrically about a predetermined plane lying substantially parallel to the direction of propagation of microwave energy along said waveguide body member, said first end portion of said waveguide body member having planar internal surfaces defining in cross section substantially a standard rectangular waveguide cross section having a predetermined waveguide width and being divided by said predetermined plane along a line parallel to its broad walls and midway therebetween, said second end portion of said waveguide body member having planar internal surfaces defining substantially a double standard height rectangular waveguide in cross section and having said predetermined waveguide width; waveguide impedance transformer means disposed between said first and second end portions; a substantially planar, conductive, thin wall member disposed contiguously along and parallel to said predetermined plane, said conductive thin wall member extending from said second end portion toward said first end portion and being, along at least a portion of its length, tapered in width from substantially full waveguide width at said second end portion to substantially zero width near said impedance transformer means; and resistive dielectric vane means disposed contiguously along and parallel to said conductive thin wall member, said vane means extending across the waveguide width of said body member and extending longitudinally throughout at least said portion of the length of said conductive thin wall member.

11. The invention according to claim 10 in which said resistive vane means is thin plastic film material at least partially coated with a lossy substance.

References Cited by the Examiner
UNITED STATES PATENTS

| | | | |
|---|---|---|---|
| 2,853,683 | 9/1958 | Murphy | 333—11 |
| 2,973,487 | 2/1961 | Hanson et al. | 333—11 |
| 3,089,103 | 5/1963 | Oliner | 333—9 |

OTHER REFERENCES

Southworth: Principles and Applications of Waveguide Transmission, Van Norstrand Co., N. J., 1960, pp. 339–343 QC 661S68.

HERMAN KARL SAALBACH, *Primary Examiner.*

P. L. GENSLER, ELI LIEBERMAN,
*Assistant Examiners.*